Aug. 16, 1966  R. H. JONES ETAL  3,266,316
DIGITAL TEMPERATURE SENSOR
Filed Nov. 26, 1963  2 Sheets-Sheet 2

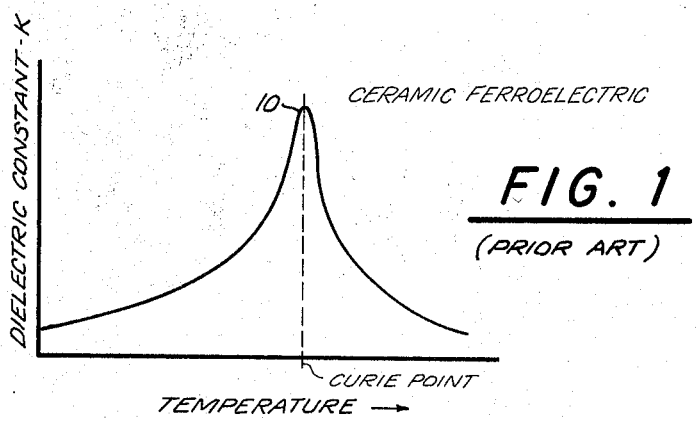
FIG. 1
(PRIOR ART)
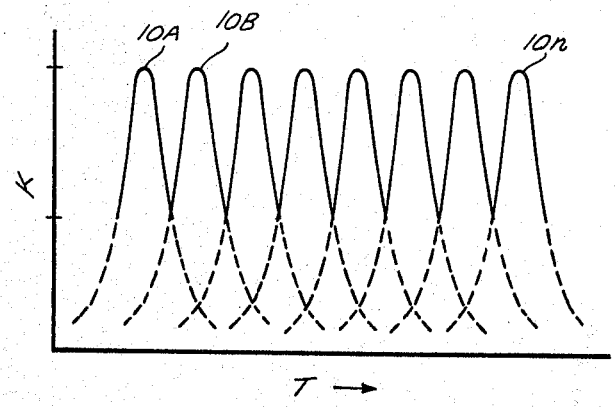
FIG. 2
FIG. 3
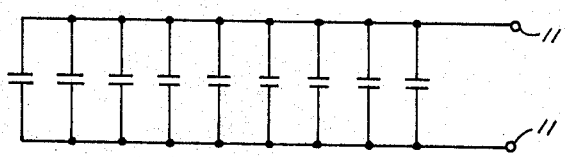

INVENTORS
RONALD H. JONES
WILLIAM O. EVANS, JR.
BY
ATTORNEYS

United States Patent Office
3,266,316
Patented August 16, 1966

3,266,316
DIGITAL TEMPERATURE SENSOR
Ronald H. Jones and William O. Evans, Jr., San Diego, Calif., assignors, by mesne assignments, to the United States of America as represented by the Secretary of the Navy
Filed Nov. 26, 1963, Ser. No. 326,305
1 Claim. (Cl. 73—362)

This invention relates to temperature indicators or pyrometers and is particularly directed to means for generating a digital electrical signal as distinguished from an analog signal, directly from the temperature sensor.

The signal from a conventional pyrometer is usually analog in nature. Where temperature information is to be employed in computations, it is necessary to convert an analog voltage to digital signals before the temperature information can be fed into the computer equipment. Such converters are relatively complex and costly and are generally unsuited for many applications because of size and weight.

An object of this invention is to provide an improved pyrometer or temperature sensor.

A more specific object of this invention is to provide a pyrometer or temperature sensor which generates directly a digital electrical signal.

The objects of this invention are attained by an array of closely assembled dielectric bodies, each body being of a material the dielectric constant of which is unique at a distinct temperature. Terminals are provided at opposite ends of each body and leads are connected to the terminals for coupling the pairs of terminals in parallel so that the dielectric constant between the leads successively increases and decreases as the temperature of the assembly progressively changes.

Other objects and features of this invention will become apparent to those skilled in the art by referring to the specific embodiments described in the following specification and shown in the accompanying drawings in which:

FIG. 1 shows a graph of the temperature-dielectric constant of one ceramic ferroelectric device of this invention;

FIG. 2 is a graph of the temperature-dielectric constant of a series of parallel connected dielectric devices;

FIG. 3 shows the electrical equivalent of the pyrometer circuit of this invention;

It has been known that the dielectric constant of certain ceramics, such as barium titanate, varies with temperature and that the dielectric constant, K, reaches a peak at a particular temperature. At that point the dielectric constant is a maximum and drops off with either increasing or decreasing temperatures as shown at 10 in FIG. 1. This peak temperature is known as the Curie point. Dielectric constant, here, has the ordinary meaning, namely; the relative electrostatic energy that may be stored per unit volume per unit of potential gradient.

According to an important feature of this invention, a series of ceramics with different Curie points can be constructed from a single compound by varying the molecular ratio of the individual elements. By physically placing a series of such elements in close thermal juxtaposition and by electrically connecting the elements in parallel, as shown in FIG. 3, a series of Curie points, 10A, 10B, 10n, at uniformly spaced temperatures, as shown in FIG. 2, will occur. The measured capacity at the terminals 11 of the parallel array, rises and falls with regularity as the temperature changes, as shown in FIG. 2. The width of the characteristic peaks can be controlled by controlling the amount of impurity in the ceramic during mixing and firing. Importantly, empirical control of mixes can control the width of peaks and spacings between peaks for binary coded read-out, as will appear.

Figure 4:
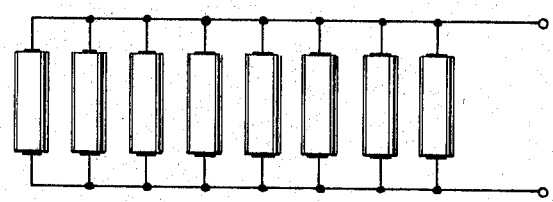
FIG. 4 is a plan view of an array of dielectric bodies according to this invention.
Figure 5:
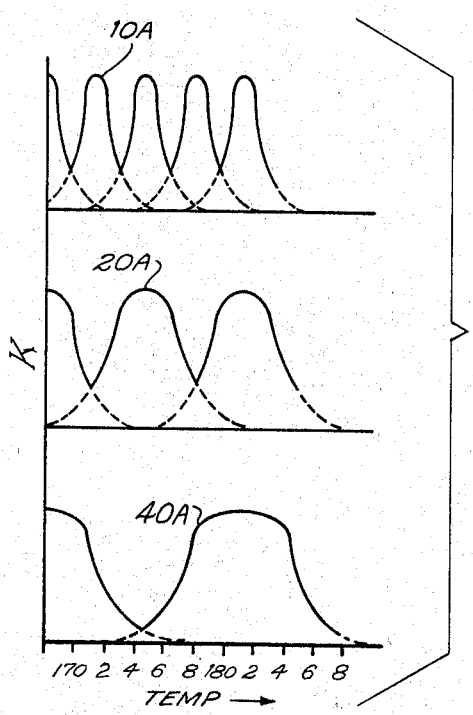
FIG. 5 is a family of curves of the temperature-dielectric constant of several cooperating dielectric arrays.

According to another feature of this invention, another set of ceramic capacitances can be constructed such that the Curie points occur over greater temperature ranges. When the second sets of capacitances are combined in parallel array, the measured capacitances goes through high and low excursions 20A as the temperature changes. However, the peaks 20A and the valleys therebetween are twice the width of the peaks and valleys 10A of the first array. Succeeding sets of capacitances may be constructed in a similar manner with succeedingly larger temperature ranges over which each material possesses a high dielectric constant. It is preferred that the breadth of Curie points, 10A, 20A, 40A, FIG. 5, in succeeding arrays be related 1, 2, 4, 8 familiar in binary coded decimal numbers systems.

One composition of the ferroelectric samples made according to this invention consisted of 400 grams of barium titanate mixed with 230 grams of ethylene dichloride and 230 grams of Rohm and Haas D-7 Acryloid resin. The latter compounds acted as the vehicle and flocculating agents to facilitate the thixotropic conditions necessary during the slip casting operation. Strontium titanate was added in 5 gram increments to the base mixture to obtain each of the succeeding mixtures for the samples tested. That is, each succeeding sample was made from a mixture that contained 5 grams more strontium titanate than the mixture used in making the preceding sample. The strontium titanate was added to the base mixture after approximately 6 grams of the material had been extracted to make a sample. Small quantities of ethylene dichloride and B-7 resin were added at regular intervals to maintain a uniform consistency in the mixture. Each mixture was mixed for a minimum of six hours in a ball mill. Upon completion of the mixing, approximately six grams of the mixture was slip cast on a flat glass plate into a sheet with an approximate thickness of 0.010 inch. This sheet of material was then baked under an infrared lamp and after baking, the sheets were cut to the desired size and then fired at 2480° F. in a furnace. After firing, electrodes were applied to opposite edges of the ferroelectric samples. It was found that terminals could be applied to the ceramic specimen more effectively with silver paint than with vacuum deposited metals. The paint technique appeared to have less tendency to produce two Curie temperatures.

Tests have been conducted with lead zirconium titanate, $PbZr_{.58}Ti_{.42}O_3$, as well as with barium titanate, $BaTIO_3$. Capacitors were made out of pellets ¼" thick.

In operation, the temperature may be changed slowly to eliminate the thermal lag differences between the dielectrics, although this effect is greatly reduced by constructing thin films of the material. By using the deposited film technique, the temperature sensors could be made in very small paper-clip sizes. For a sixteen temperature detector there would only be five lines, one common and four lines of binary code. Where the particular temperature range desired extends above or below that obtainable with the barium titanate ceramics, other materials such as the mentioned lead zirconium titanate and barium strontium titanate can effectively be employed to extend the range. A possible range with the temperature sensor of this invention extends from −100° C. to +500° C.

Figure 6:
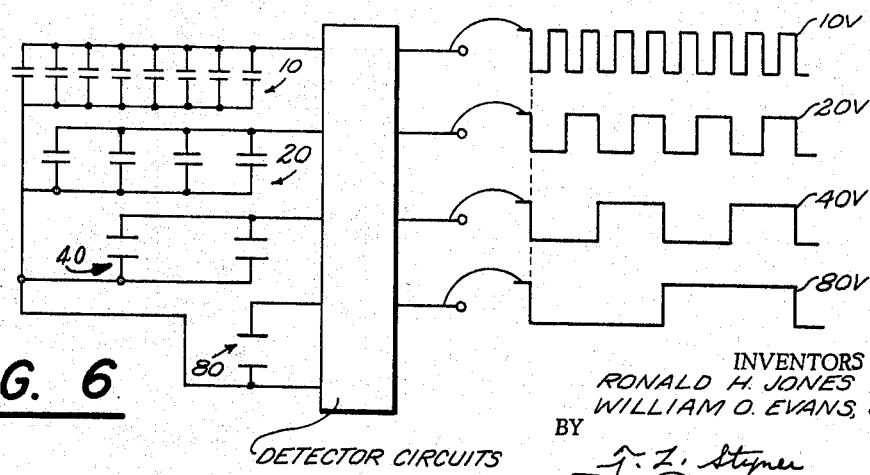
FIG. 6 is a circuit schematic diagram of a pyrometer of this invention with voltage waveforms for the output terminals of the pyrometer.

In FIG. 6 several sets 10, 20, 40, and 80 of temperature sensors are shown, the dielectric elements of each set being connected in parallel and to a separate detector circuit to produce, respectively, the series of high and low voltages 10 v., 20 v., 40 v. and 80 v. One method of detecting the dielectric constant of each of the four capacitor circuits is by measuring the alternating voltage, of unit current and frequency, across each capacitor circuit. As better shown in FIG. 5, the temperature ranges of the Curie points of the sensor bodies, are in the 1, 2, 4, 8 ratios, and the detected voltages at the output terminals are in like ratios. The detected voltages can then be read out directly as binary coded decimal numbers and can be fed in parallel directly into digital computer equipment, without further analog-to-digital conversion.

Obviously many modifications and variations of the present invention are possible in the light of the above teachings. It is therefore to be understood that within the scope of the appended claim the invention may be practiced otherwise than as specifically described.

What is claimed is:

Means for electrically indicating temperature comprising;
- a first and second set of assembled dielectric bodies, each body being of a material the dielectric constant of which is unique throughout a distinct limited temperature range, said temperature ranges of the bodies being uniformly spaced, and the temperature ranges of the bodies of the first set being twice the temperature range of the bodies of the second set;
- spaced terminals on each body, leads for coupling the pairs of terminals of bodies of each set in parallel so that the dielectric constant between the leads of each set successively increases and decreases as the function of temperature, and
- means for, respectively, detecting the dielectric constant of each set and generating different binary voltages which can be coded in terms of temperature.

References Cited by the Examiner

UNITED STATES PATENTS

| 2,842,345 | 7/1958 | Brown | 328—3 X |
| 3,087,886 | 4/1963 | Robinson | 73—362 X |

FOREIGN PATENTS 613,116   10/1948   Great Britain.

LOUIS R. PRINCE, *Primary Examiner.*

DAVID SCHONBERG, *Examiner.*

D. M. YASICH, *Assistant Examiner.*